Aug. 4, 1931.  R. E. EDDY  1,817,547
TIRE CHAIN
Filed Sept. 8, 1930
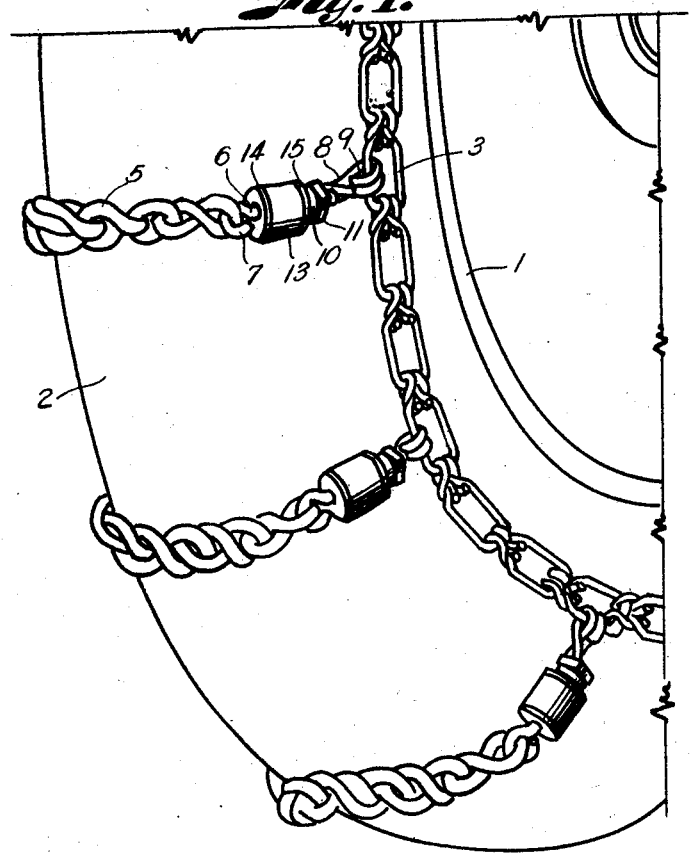
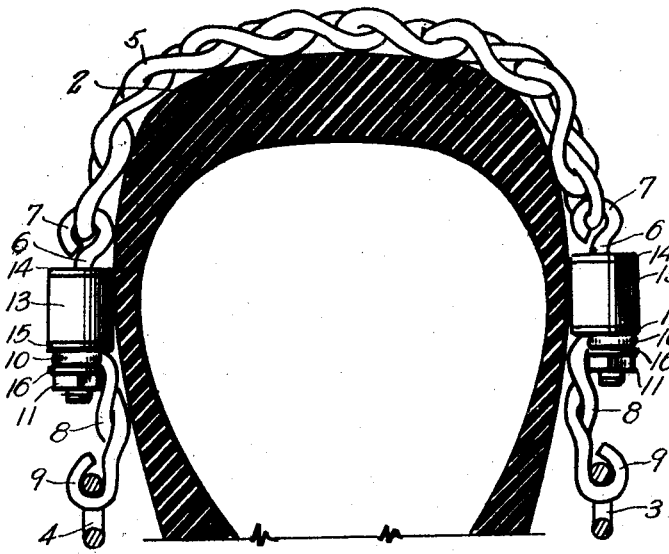
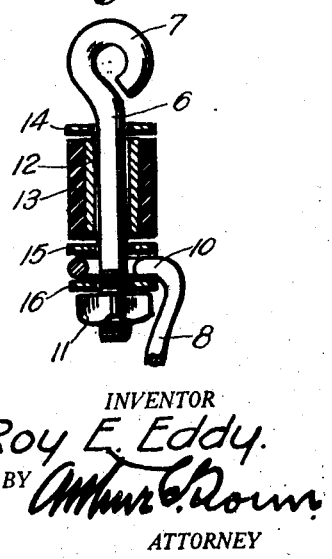
INVENTOR
Roy E. Eddy.
BY *Arthur F. Brown*
ATTORNEY Patented Aug. 4, 1931

1,817,547

UNITED STATES PATENT OFFICE

ROY E. EDDY, OF KANSAS CITY, MISSOURI

TIRE CHAIN

Application filed September 8, 1930. Serial No. 480,462.

My invention relates to tire chains and has for its principal objects to provide a chain having cross members adapted to engage a supporting surface in such a manner as to assure retention of supporting wheels against slippage, and to reduce noise and wear incident to operation of an automobile equipped with tire chains for enhancing the efficiency of chains and increasing the life of chains and tires.

In accomplishing these and other objects of my invention, I have provided improved details of structure, the preferred form of which is illustrated in the accompanying drawings, wherein:

Fig. 1 is a perspective view of a portion of an automobile wheel and portion of a tire chain mounted thereon embodying my invention.

Fig. 2 is a fragmentary section through the tire and chain illustrating means connecting a cross member with the side chains.

Fig. 3 is an enlarged section through means for connecting a cross member with one of the side chains including a bolt provided with a roller engageable with the side of the tire.

Referring in detail to the drawings:

1 designates generally an automobile wheel and 2 a tire mounted thereon. 3 and 4 designate links of series comprising a pair of side chains adapted to be arranged circularly on each side of the tire and have ends connected to form the support for cross members including chains 5, presently described in detail.

Each cross member chain is connected to the side chains by relatively long bolts 6 having eyes 7 engaged in terminal links of the cross member chain, and links or hooks 8 comprising heavy wires or bars having bent ends 9 engaged with said chain links and intermediate loop portions 10 out-turned into right angular relation with the body portions of the hook members to receive the ends of the bolts whereby nuts 11 threaded on the bolts may latch the bolts to the hooks 8.

Freely rotative on the relatively long shanks or rod-like body portions of the bolts are rollers including sleeves or bushings 12 formed of wear resistant metal, and compressible cover or bearing surface members 13 formed for example of rubber tubing, are mounted on the bushings to engage the side faces of the tire when the tire chain is mounted thereon.

Washers 14 and 15 are mounted on the bolts at opposite ends of the rollers to retain the compressible covers and form relatively broad bearing members to engage respectively the eye portions of the bolts and the inturned loop portions of the connecting members 8. Washers 16 are further mounted between the inturned loops 10 and the nuts on the bolts to reduce hazard of unscrewing the nut when the tire chain operates responsively to movement of the wheel over the road.

In using the invention a tire chain is assembled with a suitable number of cross members and the side chains are arranged with ends connected in any suitable manner to engage the cross members with the peripheral surface of the tire.

When the automobile operates on a smooth hard road, the resilient rollers will bear against the side faces of the tires while the side chains are held relatively taut and the cross members firmly engage the periphery of the tire, and rattling and rumbling noises ordinarily incident to movement of a chain-equipped wheel will be obviated.

The cross members will operate in the ordinary manner while the wheels are rotating over a dry smooth surface, with the exception that the cross chains will tend to roll due to the swivel connection thereof with the side chains, and thus avoid tendency to wear flat surfaces on the cross chains.

When a chain-equipped drive wheel tends to slip on a smooth surface or in mud, the cross chains will roll while frictionally engaged with the tire and supporting surface, and tend to assume triangular shape with their apices in the median line of the periphery of the tire and extending from the links of the side chains to which they are connected forwardly with reference to the direction of movement of the wheel.

While the cross members are rolling and assuming the triangular shape mentioned, the rollers thereon are permitting the side members to bodily effect readjustment of position and conformation without abrading action on the side faces of the tire. Whether on a level slippery surface or in mud the cross members will therefore gradually yield and thus in effect apply a succession of resisting movements to the slipping tendency of the wheel.

The tire chain will thus act to enforce traction for a driving wheel and will offer a substantially increased resistance to slippage due to the V-shaped arrangement of the cross member chains adjacent the median line of the periphery of the tire. The rollers on the swivel bolts promote the formation of the cross chains in V-shape, and assure symmetrical arrangement of the cross member chains on the periphery of the tire.

A similar result occurs when a wheel is locked against movement, a cross chain which engages the ground first rolling until it assumes a V-shape, and then being anchored in such shape to provide a maximum amount of frictional engagement with the ground.

The apex of the V of a cross chain engaging the ground being on the median line of the tire, tends to hold the wheel in the line of travel and prevent side slippage.

In mud, the cross members have a tendency to draw the side chains tight, and anchor the chain as a whole to the wheel, while engaging the mud to enforce traction, whereas a wheel may spin within an ordinary tire chain while the chain is prevented from moving with the wheel by reason of engagement of the chain with the mud. A similar distinction in operation occurs on slippery smooth surfaces.

In practice, I prefer to make the cross members somewhat longer than cross members provided in ordinary tire chains, in order to assure substantial length for the V-shaped extended members, the additional length being chiefly provided by the roller-supporting bolts. The side chains will therefore be shorter and form smaller circles than in ordinary chains, whereby the rollers will be located on the wall of the tire closer to the rim of the wheel.

The tension of the extended cross member chains engaged with the tire tread and tensioning the side chains will space the rollers from the side wall of the tire to a certain extent.

What I claim and desire to secure by Letters Patent is:

1. A tire chain including a pair of side chains and a cross member including a chain, loop members connected to said side chains, bolts connected to said cross chain and mounted in said loop members, and rollers on said bolts.

2. In a tire chain including a pair of chains, cross members including bolts connected to said pair of chains, and rollers including bushings mounted on said bolts and compressible members on said bushings.

3. In a tire chain including a pair of side chains adapted to be arranged circularly, cross chains having rotatable connection with said side chains, and rollers mounted on said cross chains to engage the side of a tire including a metal bushing and a compressible cover on said bushing.

4. In a tire chain including a pair of chains and cross chains, means connecting the cross chains with said pair of chains including bolts having straight shanks, rollers on said bolts, and hooks having loops for rotatively receiving said bolts.

5. A tire chain comprising a pair of chains adapted to be arranged circularly, cross chains connecting said pair of chains, and rollers mounted on said cross chains adjacent said pair of chains.

6. A tire chain comprising a pair of side chains adapted to be arranged circularly, cross chains having end members connecting said cross chains to said side chains, rollers mounted on said end members, and means for retaining said rollers on said end members.

7. In a tire chain including a side chain and a cross chain, a connecting member having one end connected to the side chain and an opposite end connected to one end of the cross chain, and a roller on said connecting member.

8. In a tire chain including a side chain and a cross chain, a member connecting the cross chain to the side chain, and a compressible roller on said member.

9. In a tire chain including a side chain and a cross chain, a member connecting the side chain to the cross chain, a compressible roller rotative on said member, means at one end of said member for limiting movement of the roller longitudinally on said member, and a shield on said member between the roller and said means.

In testimony whereof I affix my signature.

ROY E. EDDY.